(No Model.)  3 Sheets—Sheet 1.
H. ROWNTREE.
INDICATOR FOR ELEVATORS.
No. 512,223.  Patented Jan. 2, 1894.
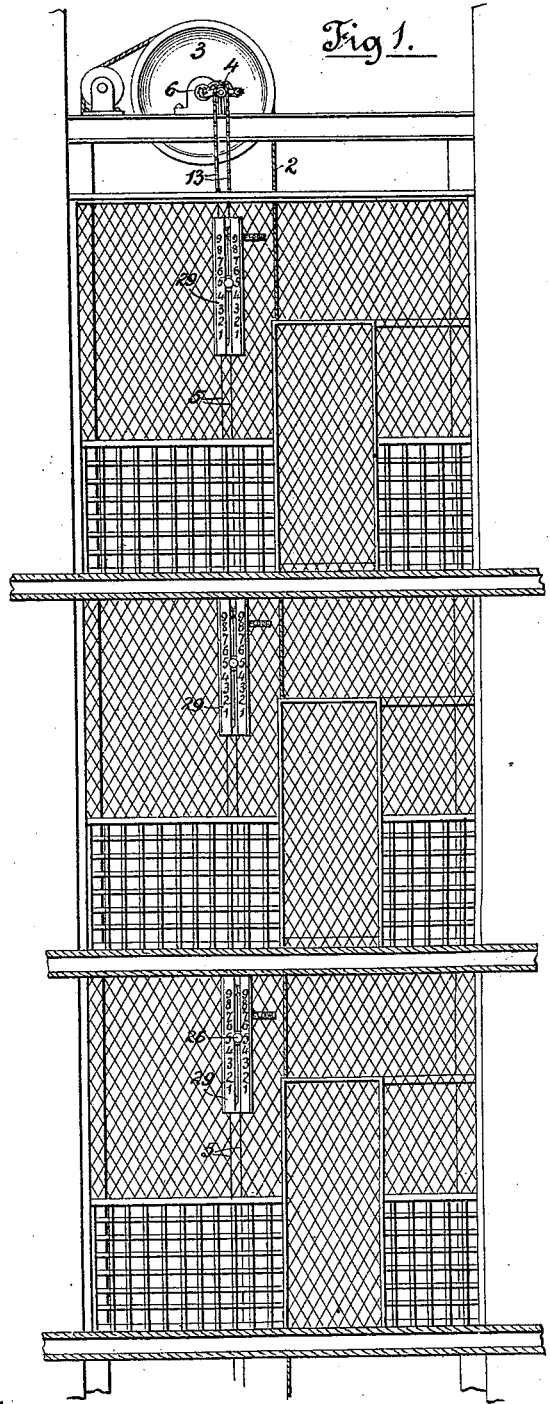
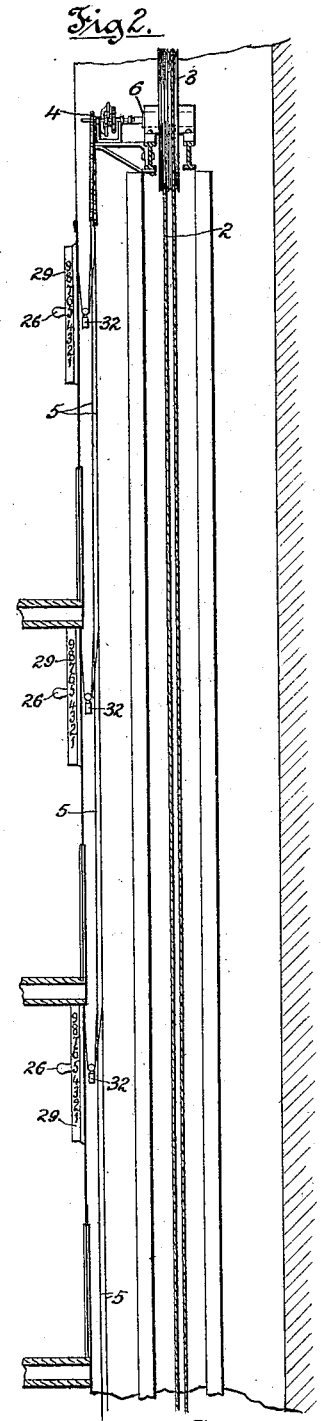

(No Model.)

H. ROWNTREE.
INDICATOR FOR ELEVATORS.

No. 512,223. Patented Jan. 2, 1894.

3 Sheets—Sheet 2.

Witnesses
Wm. M. Rheem
Elsie Remett

Inventor
Harold Rowntree
by Raymond & Veeder
Attorneys.

(No Model.) 3 Sheets—Sheet 3.
H. ROWNTREE.
INDICATOR FOR ELEVATORS.
No. 512,223. Patented Jan. 2, 1894.
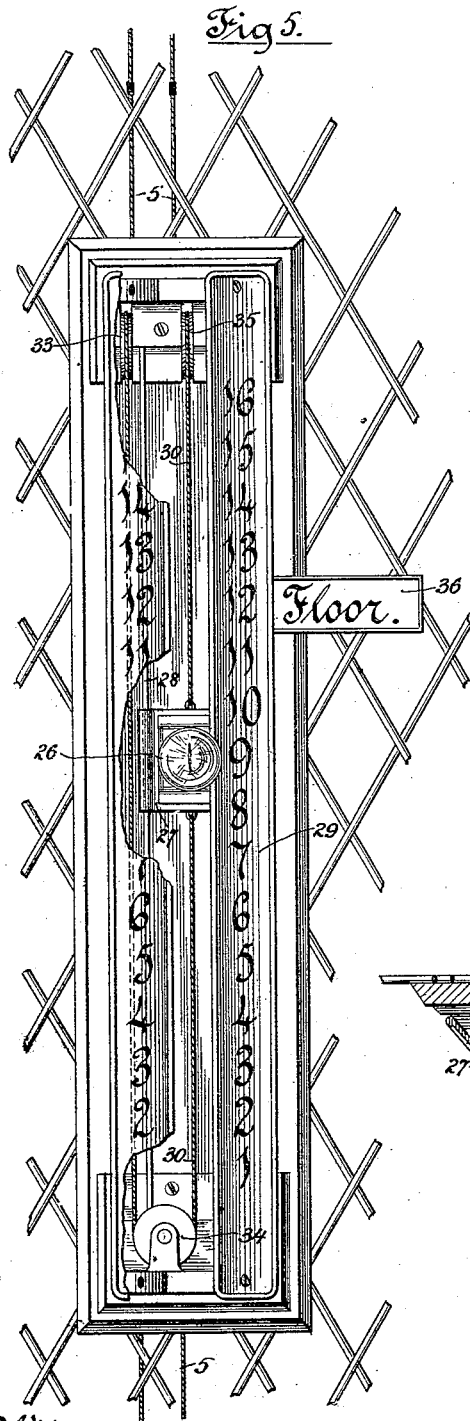
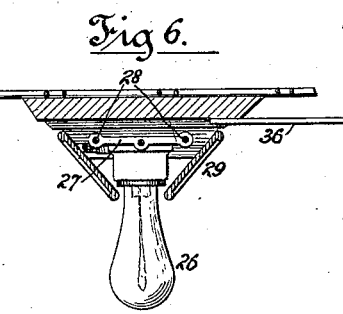
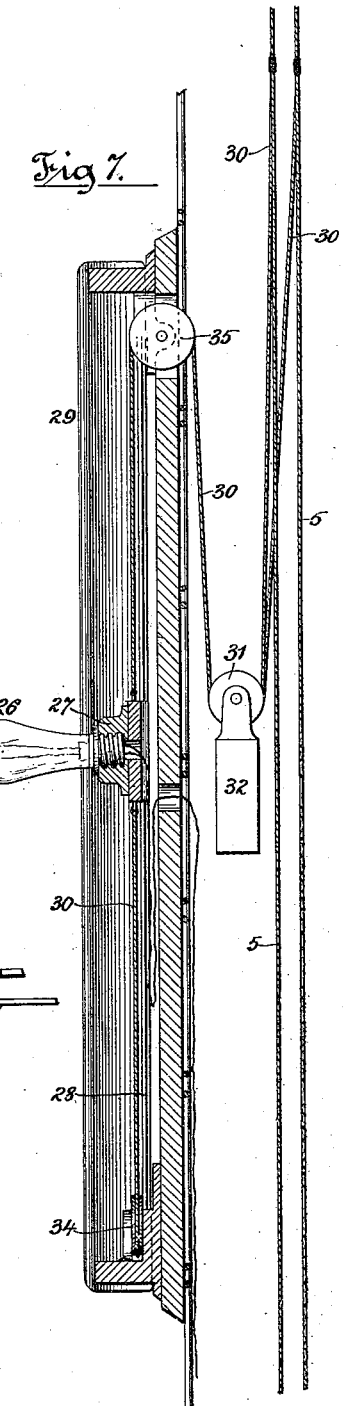
Witnesses
Wm. M. Rheem
Elsie Kernett
Inventor
Harold Rowntree
by Raymond & Veeder
Attorneys.

UNITED STATES PATENT OFFICE.

HAROLD ROWNTREE, OF KANSAS CITY, MISSOURI, ASSIGNOR OF ONE-HALF TO J. B. BURDETT, OF SAME PLACE.

INDICATOR FOR ELEVATORS.

SPECIFICATION forming part of Letters Patent No. 512,223, dated January 2, 1894.

Application filed January 18, 1892. Serial No. 418,481. (No model.)

*To all whom it may concern:*

Be it known that I, HAROLD ROWNTREE, a citizen of the United States, residing in Kansas City, county of Jackson, and State of Missouri, have invented certain new and useful Improvements in Indicators for Elevators, of which the following is a specification, reference being had to the accompanying drawings.

The object of my invention is to provide a conspicuous and easily read indicator by which the position and direction of the movement of the car will be shown at all the landings.

It is a further object of my invention to provide against the ordinary sources of derangement such as wear of the parts and the extension and contraction of the cords or rods by which the indicator is operated, by variations of moisture or temperature. I also provide devices by which the position of the indicator can be automatically corrected so as to agree with the position of the car notwithstanding the creeping of the cables upon the sheaves over which they run.

Figure 3:
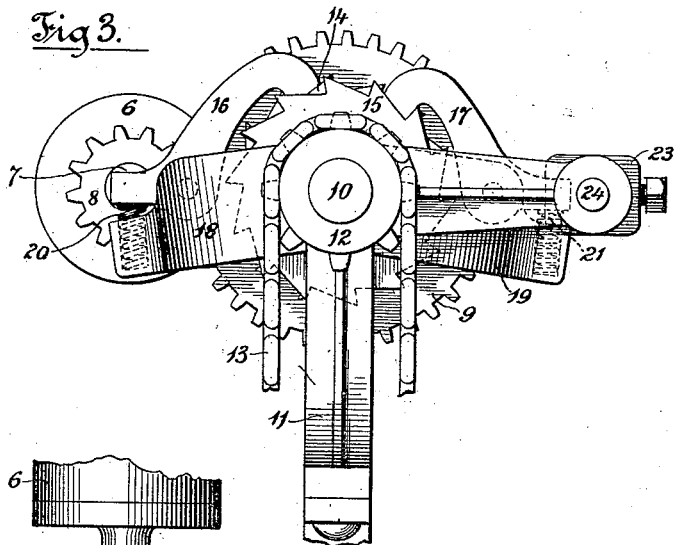
Figure 4:
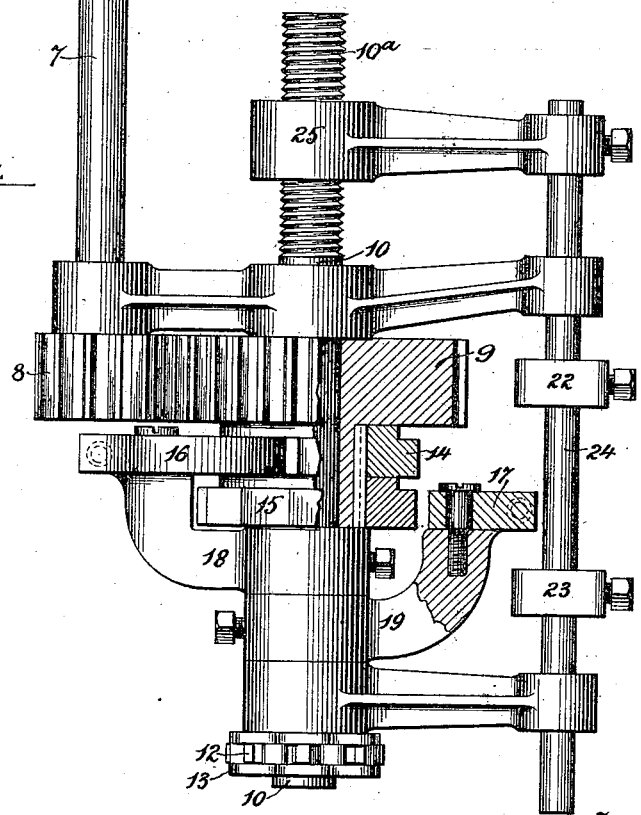

In the accompanying drawings: Figure 1 is a side elevation of an elevator-shaft showing the several landings at which the indicator appears. Fig. 2 is a vertical section of the same. Fig. 3 is an end elevation of the actuating mechanism by which the rods and cables connected to the indicators are moved. Fig. 4 is a plan view of the same, a portion being shown in section. Fig. 5 is a view on a larger scale of the indicator devices located at each floor, a portion of the casing being removed in order to show the interior. Fig. 6 is a cross section; and Fig. 7, a vertical section of the same.

2 (Figs. 1 and 2) are the hoisting cables to which the elevator-car is attached. They pass over a sheave 3 at the top of the elevator-shaft and the mechanism 4 for actuating the indicator-rods 5 is connected with and operated by said sheave 3. The connection of the actuating mechanism is made preferably through the shaft or pivot 6 of the sheave 3.

The actuating mechanism, as seen in detail on a large scale in Figs. 3 and 4, consists of a stud or spindle 7 attached to the shaft 6 upon the outer end of which is a pinion 8. Said pinion meshes with a gear 9 upon a shaft 10. Said shaft 10 is supported by the frame 11 and bears at its outer end a sprocket-wheel 12 over which passes a section of chain 13. To the latter are attached the rods or cables 5 before mentioned which extend the length of the elevator shaft. The gear 9 is loose upon the shaft 10 and is provided with two ratchet-wheels 14 and 15 whose teeth face in opposite directions. Engaging with the teeth of the ratchets 14 and 15 are pawls 16 and 17, respectively, which are carried by arms 18 and 19 secured to the shaft 10. The engagement of the pawls with the ratchets is secured by the springs 20 and 21, respectively, which are so placed as to throw the pawls forward. The shaft 10 is thus positively driven in both directions from the sheave 3 so long as the pawls 16 and 17 are in engagement. It will sometimes happen, however, that, owing to the creep of the cables upon their sheave or sheaves, before the car has reached one extremity or the other of its travel the elevator indicator, operated by the mechanism just described, will have reached the limit of its movement and unless some means were provided for disconnecting the two, injury would be done to the indicator or it would fail to show correctly the position of the car; I therefore provide for the release of one pawl or the other as the indicator reaches one end or the other of its movement so that it will remain stationary until the car has reached the limit of its travel.

The devices for releasing the pawls consist of stops 22 and 23 upon a sliding-rod 24 which is actuated by a nut 25 upon the threaded end 10ᵃ of the shaft 10. The positions of the stops 22 and 23 are so fixed that when the limit of movement of the indicator has been reached one stop or the other will engage with the outer end of its corresponding pawl as the latter revolves with the shaft 10, and the revolution of the pawls will only continue until the actuating pawl has been left clear of its ratchet when it will remain at rest until the travel of the elevator car has been completed. Upon the reverse of the elevator car the other pawl which has not been disengaged will be in position to reverse the movement of the indicator; upon the latter's initial movement the other pawl will be freed from its stop and once more engage with its ratchet. It is understood, of course, that this actuating mechanism may be connected in any convenient way with the sheaves of the elevator cables or with any other wheel or gear receiving movement corresponding to that of the elevator-car.

The connection of the rods or cables 5 to the separate indicator mechanisms at each floor is shown in detail in Figs. 5 to 7 inclusive. The indicator itself consists, as herein shown, of an incandescent electric lamp 26 which is mounted upon a slide 27 moving upon guide-rods within the housing 29. For this purpose the electric lamp has special advantages. It is very conspicuous and not only serves the purpose of an index or pointer, but also illumines the figures of the indicator so that they can be easily read which is an important advantage for the reason that the elevator-shafts are often poorly lighted. It is to be understood, moreover, that this part of my device is to a considerable extent independent of the special actuating mechanism herein shown and described, as the electric lamp may be used with other actuating mechanism having the same general functions.

The connection herein shown between the rods or cables 5 and the slide 27 carrying the lamp consists of a cord 30 which is secured at one end to one of the rods 5 and passes thence to one of a pair of sheaves 31 attached to a weight 32, thence over a sheave 33 at the top of the indicator casing, thence downward to a sheave 34 at the bottom of the casing and up to the slide 27; thence it extends upward from the slide 27 over a sheave 35 and thence to the second sheave 31 upon the weight 32 and is fastened to the other rod or cable 5 as shown.

I have described the cord 30 as continuous from its fastening at one end to one of the cables 5 to its fastening at the other end to the other cable, but it does not necessarily consist of a single piece for it may be divided at the point of attachment to the slide 27 and it is so shown in Fig. 5, but whether it is so divided or not is totally immaterial, the action being precisely the same.

The weight 32 which is supported in the bights of the cord 30 serves to keep it taut at all times and thus preserve an even and accurate movement of the indicator, compensating not only for the stretch of the cord 30 but for variations in the length of the rods or cables 5, such variations being quite considerable in amount in the higher buildings which are now common.

At the side of the scale containing the designating figures of the several floors, I fix a plate 36 showing the word "Floor" or some other marking by which the floor at which the indicator is placed may be identified.

In the foregoing description the expression "rods or cables 5," is employed for the reason that for the specified purpose a rod is the equivalent of a cable and either may be used with equally good results.

In the enlarged views, Figs. 5 and 7, I have shown cables, but as it is apparent that rods might be substituted and perform equally well the function of the cables, it is to be understood that my invention contemplates the use of either.

Without confining myself to the precise details of construction herein shown and described, I claim—

1. In an indicator for elevators, the combination of a scale showing the numbers of the floors or landings; an incandescent lamp forming an index or pointer to said numbers; and actuating devices connected to said lamp having a movement corresponding to that of the car, substantially as described.

2. In an indicator for elevators, the combination of actuating mechanism connected to the sheaves over which the elevator cables pass; cables extending the length of the elevator-well and operated by said actuating mechanism; a slide connected to and operated by said cables; an electric lamp carried upon said slide; and a scale bearing the numbers of the several landing-floors, substantially as and for the purpose specified.

3. The combination in an elevator-indicator of a slide carrying an indicator pointer, a pair of cables extending the length of the shaft; a cord fastened at its ends to the respective cables and connected to the slide carrying the indicator pointer; and a weight hung in the bights of said cord whereby the tension of the latter and of the pair of cables is maintained, substantially as described.

4. The combination in an elevator-indicator of a slide carrying an indicator pointer, a pair of cables extending the length of the shaft; a cord fastened at its ends to the respective cables passing over sheaves at the top and bottom of the indicator-casing and having the slide bearing the index or pointer secured at an intermediate point; and a weight hung in the bights of said cord whereby the tension of the latter and of the pair of cables is maintained, substantially as described.

5. The combination in an elevator-indicator of actuating mechanism consisting of a gear connected to and driven from the sheaves over which the elevator-cables pass; reversely facing ratchet-wheels affixed to or formed upon said gear; a shaft upon which said gear may rotate; arms upon said shaft carrying pawls and each engaging with one of the ratchet-wheels carried by said gear; stops deriving movement from said actuating gear and adapted to make contact, respectively, with one or the other of said pawls as the indicator reaches the limit of its movement in either direction, substantially as described.

6. The combination with an elevator-indicator, of actuating mechanism consisting of a spindle 7 connected to the shaft, of the sheaves over which the elevator cables pass; a pinion 8 meshing with a gear 9; reversely facing ratchet-wheels 14 and 15 connected to said gear 9; a shaft 10 upon which the gear 9 may rotate; the arms 18 and 19 bearing pawls 16 and 17 adapted to engage with said ratchets; the stops 22 and 23 connected upon the slide rod 24 and adapted to make contact with the pawls 16 and 17, respectively; and a nut 25, working upon the threaded end $10^a$ of the shaft 10, imparting motion to the shaft 24, substantially as described.

HAROLD ROWNTREE.

Witnesses:
WILFRID ROWNTREE,
JAMES C. HORTON.